Patented Dec. 2, 1924.

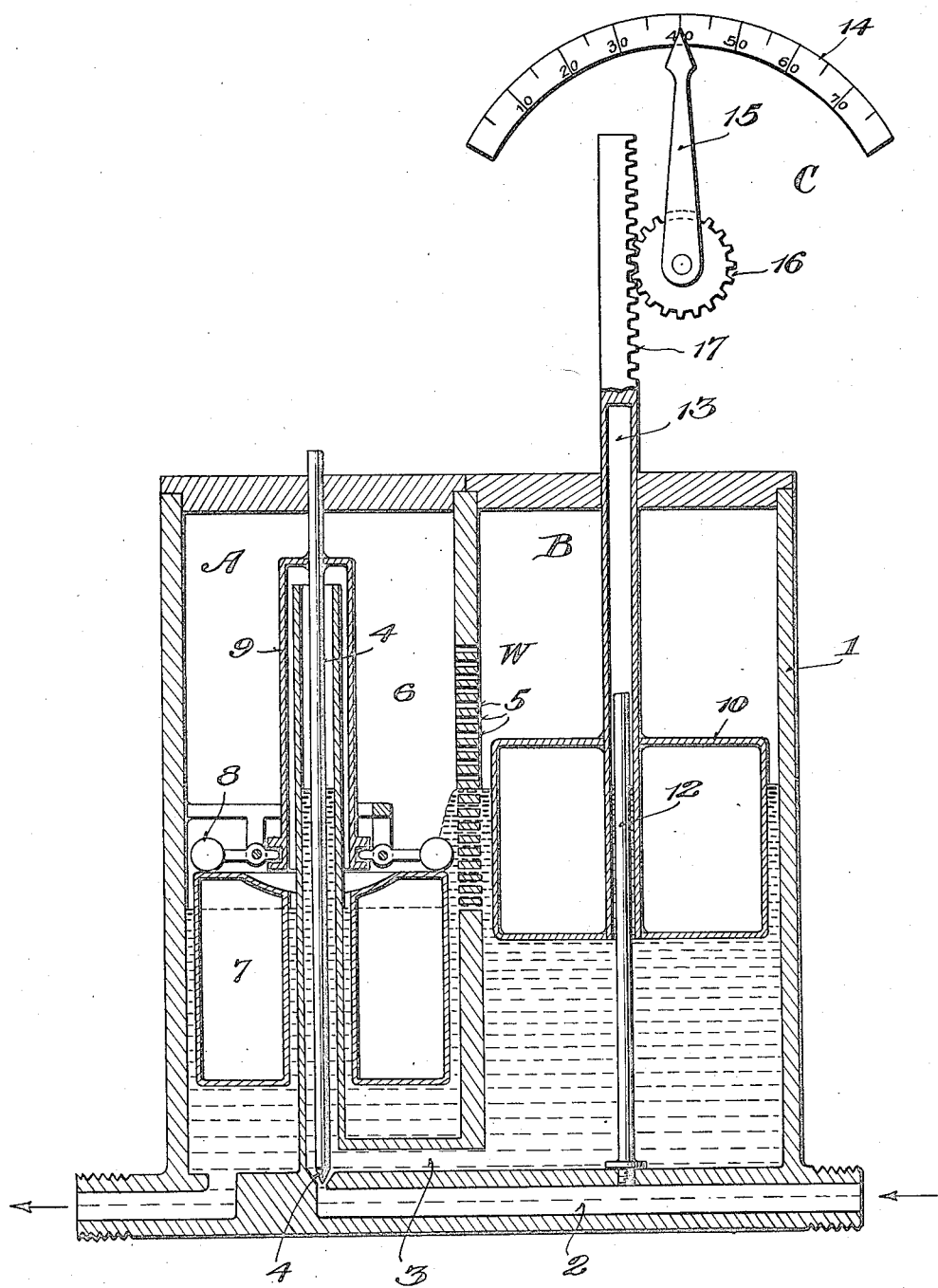

1,517,905

UNITED STATES PATENT OFFICE.

CLINTON WALLACE HOUGH, OF BOONVILLE, NEW YORK.

DEVICE FOR INDICATING QUANTITY OF FUEL CONSUMED BY INTERNAL-COMBUSTION ENGINES.

Application filed October 15, 1921. Serial No. 508,013.

*To all whom it may concern:*

Be it known that I, CLINTON W. HOUGH, citizen of the United States, residing at Boonville, in the county of Oneida and State of New York, have invented certain new and useful Improvements in Devices for Indicating Quantity of Fuel Consumed by Internal-Combustion Engines, of which the following is a specification.

This invention relates to a device for continually indicating the quantity of liquid passing from one chamber to another in a given unit of time in accordance with the withdrawals or demand on one of the chambers, as for example, the fuel reservoir or chamber of a carbureter in the fuel system of an internal combustion engine or the like.

To that end the invention contemplates as one of its objects a simple and practical arrangement whereby the amount of fuel passing through the fuel system of the car will be indicated at all times to thereby visibly show the rate of fuel consumed, per unit of time. That is to say, it is proposed to provide a device that may be conveniently incorparted in the carbureter unit of the fuel system, and arranged to indicate the rate of fuel flow from the tank or other source of supply to the carbureter in gallons per hour, liters per hour, or other like unit.

A further and more specific object of the invention is to provide a simple and practical arrangement that renders the invention capable of commercial embodiment in a practical and convenient manner.

In the drawings:

The figure is a vertical sectional view illustrating the improved arrangement proposed by the present invention.

While it will of course be understood that the invention is susceptible of embodiment in various structural forms, it will be observed from the drawing that the same preferably includes in its organization a carburetor unit A and a gauge unit B having a suitable indicator C associated therewith.

The gauge unit B includes a receiving chamber 1 adapted to be furnished with fuel from the conduit 2 connected with the source of supply through the passageway 3 controlled by the needle valve 4. At a suitable height the side wall of the chamber 1 is provided with a weir opening designated generally as W and consisting of a plurality of perforations or holes 5 arranged at different elevations and discharging into the delivery chamber 6 of the carburetor unit A. This delivery chamber 6 has arranged therein a float 7 for controlling the movement of the needle valve 4 through the medium of the levers 8 and connections 9. Thus, the needle valve 4 is controlled by the level of liquid in the chamber 6 of the carburetor unit and as the level changes the needle valve 4 is operated to thereby regulate the quantity of fuel passing from the supply conduit 2 to the passageway 3 which opens into the chamber 1.

Within the chamber 1 of the gauge unit a suitable float 10 is provided the same being guided upon a post or standard 12 and having an exteriorly projecting stem portion 13 operatively connected with any suitable type of indicator device C. However, in the form shown by way of example, the indicator may consist of the scale 14 and pointer 15 operated by a pinion 16 meshing with the rack 17 of the stem 13. In that embodiment the scale 14 is calibrated to indicate either gallons per hour, liters per hour, or the like according to the desired unit and as the pointer or hand 15 moves thereover the indication is continually visible throughout the operation of the device which is substantially as follows:—

Fuel flowing from the tank or other source of supply through the conduit 2 is regulated in its passage to the chamber 1 by the needle valve 4 which is controlled by the level of liquid in the chamber 6 of the carburetor. In that connection it will be understood that instead of the needle valve 4 permitting fuel to be supplied directly to the chamber 6 of the carburetor, the construction is such that the fuel is diverted into the chamber 1 in quantities proportional to the unseating of the needle valve 4. As the level of liquid fuel rises in the chamber 1 a corresponding lift or rise will be given to the float 10 thereby causing the pointer 15 to move over the dial and give the proper indication. Meanwhile, the rising fuel in the tank 1 will find its way into the chamber 6 through the variable discharge outlet afforded by the weir opening W. Obviously, as the level of the chamber 6 rises the float 7 will also rise and seat or close the needle valve 4 to thereby reduce the amount of fuel fed into the supply chamber 1 of the gauge unit. When the motor is running at high speed or under increased load and therefore requires additional fuel from the chamber 6, the float 7 will correspondingly drop and cause the reversal of the action above described to thereby lift the needle valve to permit more fuel to flow into the chamber 1 and thereby cause the float 10 to again elevate and give a correspondingly higher indication.

Without further description it is thought that the features and advantages of the invention will be readily apparent to those skilled in the art and it will of course be understood that changes in the form, proportion, and minor details of construction may be resorted to without departing from the spirit of the invention or the scope of the appended claims.

I claim:—

1. A device for indicating the quantity of liquid fuel consumed by an internal combustion engine or the like including a carbureter having a delivery chamber, and a gauge unit having a receiving chamber provided with a discharge outlet of variable area opening into said chamber; means for maintaining the level of liquid fuel in the receiving chamber above the level of liquid fuel in the delivery chamber, a float responsive to the variable level of liquid fuel in the receiving chamber, and an indicator adapted to be operated by said float and calibrated quantity per unit of time.

2. A device for indicating the quantity of liquid fuel consumed by an internal combustion engine or the like including a carbureter having a delivery chamber, and a gauge unit having a receiving chamber provided with a discharge outlet of variable area opening into the said delivery chamber, a needle valve, a float controlled by the level of liquid fuel in the delivery chamber for actuating said needle valve to maintain the level of liquid fuel in the receiving chamber above the level of liquid fuel in the delivery chamber, a float responsive to the variable level of liquid fuel in the latter chamber and an indicator adapted to be operated by said float and calibrated quantity per unit of time.

3. A device for indicating the quantity of liquid fuel consumed by an internal combustion engine or the like including a carbureter unit having a delivery chamber, a gauge unit having a receiving chamber adapted to communicate with the delivery chamber of the carburetor through a weir opening consisting of a plurality of perforations arranged to permit more or less liquid fuel to flow from the receiving chamber to the delivery chamber according to the level in said receiving chamber, a needle device, a float controlled by the level of liquid fuel in the delivery chamber for operating the needle device to regulate the supply to the receiving chamber, a float in said receiving chamber having a portion projecting exteriorly of the delivery chamber, and an indicator calibrated quantity per time operated by said exteriorly projecting portion.

4. A device of the class described including a delivery chamber, a gauge unit having a receiving chamber provided with a discharge outlet of variable area opening into said delivery chamber, float controlled means operated by the level of liquid in the delivery chamber for maintaining the liquid head in the receiving chamber at a point above the head in the delivery chamber, and means including an indicator calibrated in quantity per unit of time to register the varying differential in the liquid head of said chambers.

5. A device of the class described including a delivery chamber, a gauge unit having a receiving chamber provided with a discharge outlet of variable area opening into said delivery chamber, means controlled by the withdrawal of liquid from the delivery chamber to maintain the liquid head in the receiving chamber above the level of liquid in said delivery chamber, and means including an indicator calibrated in quantity per unit of time to register the varying differential in the liquid head of said chambers.

In testimony whereof I hereunto affix my signature in the presence of two witnesses.

CLINTON WALLACE HOUGH.

Witnesses:
EMORY L. GROFF,
VIRGINIA L. WATSON.